United States Patent
Son (10) Patent No.: US 7,817,337 B2
(45) Date of Patent: Oct. 19, 2010

(54) SCREEN FOR DISPLAY AND MANUFACTURING METHOD THEREOF

(76) Inventor: Changmin Son, 317-1103, Doogyeon Maeul Woobang APT., Jeongja-Dong, Jangan-Gu, Suwon-Si, Gyeonggi-Do 440-300 (KR)

(\*) Notice: Subject to any disclaimer, the term of this patent is extended or adjusted under 35 U.S.C. 154(b) by 258 days.

(21) Appl. No.: 11/813,564

(22) PCT Filed: Jan. 6, 2006

(86) PCT No.: PCT/KR2006/000066

§ 371 (c)(1),
(2), (4) Date: Jul. 9, 2007

(87) PCT Pub. No.: WO2006/073286

PCT Pub. Date: Jul. 13, 2006

(65) Prior Publication Data

US 2008/0123187 A1    May 29, 2008

(30) Foreign Application Priority Data

Jan. 7, 2005    (KR) .................. 10-2005-0001464

(51) Int. Cl.
*G03B 21/56* (2006.01)
(52) U.S. Cl. ..................... 359/443; 359/452
(58) Field of Classification Search .......... 359/443, 359/452–453
See application file for complete search history.

(56) References Cited

U.S. PATENT DOCUMENTS

| 4,401,368 | A | \* | 8/1983 | Drechsel et al. ............. 359/452 |
| 6,061,178 | A | \* | 5/2000 | Park ............................. 359/457 |
| 6,660,326 | B2 | \* | 12/2003 | Sano et al. .................... 427/180 |
| 2002/0171929 | A1 | \* | 11/2002 | Kim et al. ..................... 359/457 |

FOREIGN PATENT DOCUMENTS

| JP | 62-038431 | 2/1987 |
| JP | 03-200949 | 9/1991 |
| JP | 06-201906 | 7/1994 |
| JP | 07-207101 | 8/1995 |
| JP | 10-039420 | 2/1998 |
| JP | 2001-083554 | 3/2001 |

(Continued)

*Primary Examiner*—Christopher E Mahoney
*Assistant Examiner*—Leon W Rhodes
(74) *Attorney, Agent, or Firm*—Pepper Hamilton LLP (57) ABSTRACT

The present invention generally relates to a laminated image panel and a fabrication method thereof for projecting images projected from an image optical engine, on a screen by reflecting and/or transmitting the images. The laminated image panel in accordance with the present invention comprises front elements, rear elements disposed in opposition to the front elements, sealants for forming a predetermined cell by mutually bonding opposed rim parts of the front elements and the rear elements and for sealing the front and rear elements by separating the front elements from the rear elements at certain intervals, and a diffusing medium injected into the cell and uniformly diffusing the projection images in transparent and/or semitransparent state. The diffusing medium is created, in a predetermined ratio, by mixing a water-soluble polymeric material that forms a transparent solution by being dissolved in water, a light curable hydrophilic monomer having hydrophilicity and a high dispersion in water, a photoinitiator for inducing a polymerization by interacting with the light curable hydrophilic monomer, and a solvent.

18 Claims, 4 Drawing Sheets

FOREIGN PATENT DOCUMENTS

| | | |
|---|---|---|
| JP | 2001-242546 | 9/2001 |
| JP | 2002-214433 | 7/2002 |
| JP | 2002-277966 | 9/2002 |
| JP | 2004-034325 | 2/2004 |
| JP | 2004-361923 | 12/2004 |
| KR | 10-2001-99829 | 11/2001 |
| KR | 10-2003-12452 | 2/2003 |
| KR | 10-2003-68589 | 8/2003 |
| KR | 10-2003-71439 | 9/2003 |
| KR | 10-2004-07333 | 1/2004 |

* cited by examiner

[Fig. 1]

Prior Art

[Fig. 2]

Prior Art

[Fig. 3]

Prior Art

SCREEN FOR DISPLAY AND MANUFACTURING METHOD THEREOF

CROSS-REFERENCE TO RELATED APPLICATIONS

This application is a U.S. national phase of International Application No. PCT/KR2006/000066 filed Jan. 6, 2006 which claims the benefit of priority to Korean Patent Application No. 10-2005-0001464 filed Jan. 7, 2005 which is hereby incorporated by reference in its entirety.

TECHNICAL FIELD

The present invention generally relates to a screen for display and manufacturing method thereof, and more specifically, to 1) an image panel that realizes a holographic effect as if an image floats in the air by projecting the image on a transparent panel, 2) an image panel capable of viewing an image in both directions (front and back) by projecting the image on a panel which transmits some of incident beams while reflecting the rest beams, and/or 3) a laminated image panel and a fabrication method thereof for viewing an image in front direction by projecting the image on a reflective panel which reflects most of incident beams.

BACKGROUND ART

As representative examples of prior screens which project incident images on a viewing space, there are front-directional projection type screens that project incident beams by reflecting them, a rear-directional projection type screens and holographic screens that project incident beams by transmitting them. In reference to drawings, each example will be described as follows.

Figure 1:
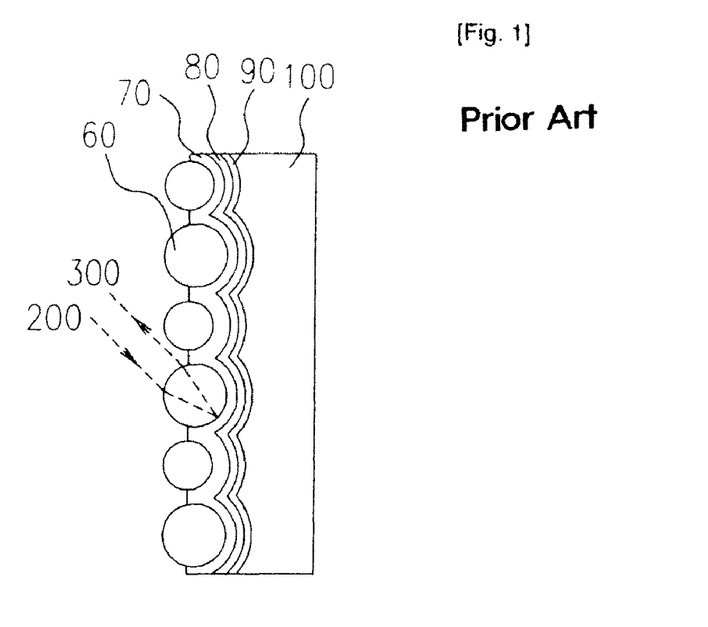
FIG. 1 is a sectional view of a prior front-directional projection type screen.

FIG. 1 is a sectional view of a prior front-direction projection type screen. Like shown in FIG. 1, the prior front-directional projection type screen is designed to view images by forming incident beams (200) projected on a front side of the screen as reflective beams (300), after the incident beams (200) are reflected on the surface of the screen. Commonly, white cloth, film, and an acryl material (100) are used as basic materials of the screen, and there are various treatment methods applied to the surface of the material (100) in order to improve screen characteristics. Specifically, a method of leaving fine scars on the surface of material or coating fine particles such as glass beads (60), or a method of conducting an aluminum coating (80) has been used. Besides, a glass bead protective layer (70) for protecting the glass beads and an adhesive layer (90) is provided as well for attaching the glass beads to the material (100).

However, in case of the front-directional projection type screen, there may be scars owing to external stimulation since the surface of the material is processed like above, and it is difficult to manage the screen cleanly so that a bad angular field is obtained.

Figure 2:
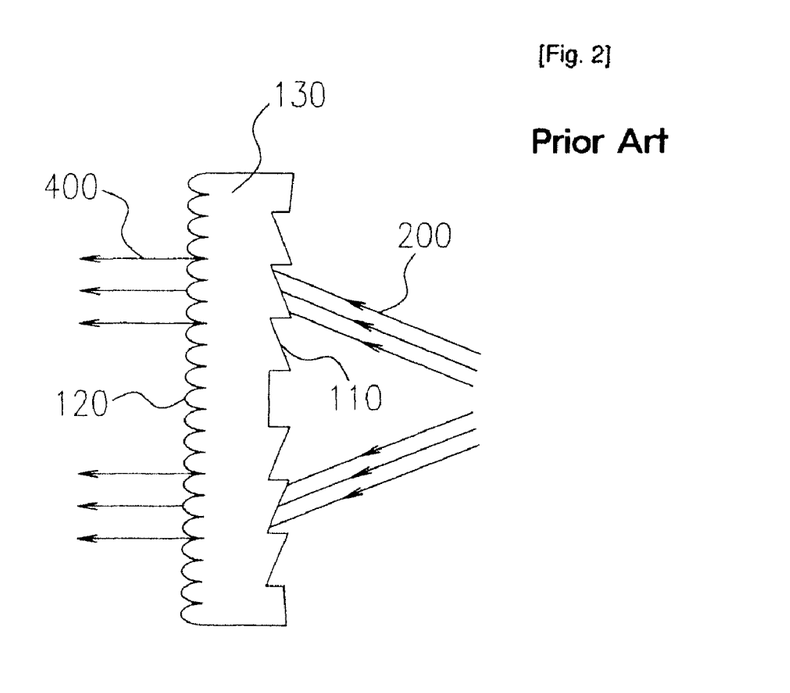
FIG. 2 is a sectional view of a fresnel lens/lenticular lens screen of a prior rear-directional projection type screen.

FIG. 2 is a sectional field of a prior rear-directional projection type screen having a fresnel lens and a lenticular lens. Like shown in FIG. 2, the rear-directional projection type screen transmits images (200) projected in rear direction, in front direction, so that the user can view the images in front direction.

A simple rear-directional projection type screen can be provided by processing the surface of a transparent film or a transparent acryl(130) in various methods. In detail, there is a method of improving characteristics of the rear-directional projection type screen by forming numerous fine optical lenses, that is, a fresnel lens (110) and a lenticular lens (120), like shown in FIG. 2.

As for an optical lens-type screen with a fresnel and lenticular lens-type screen of FIG. 2, there is a problem of viewing on a side owing to a bad angular field in terms of lens characteristics. Furthermore, it needs fine printing, extruding, and coating technologies, resulting in a complicated fabrication process.

Figures 3, 4:
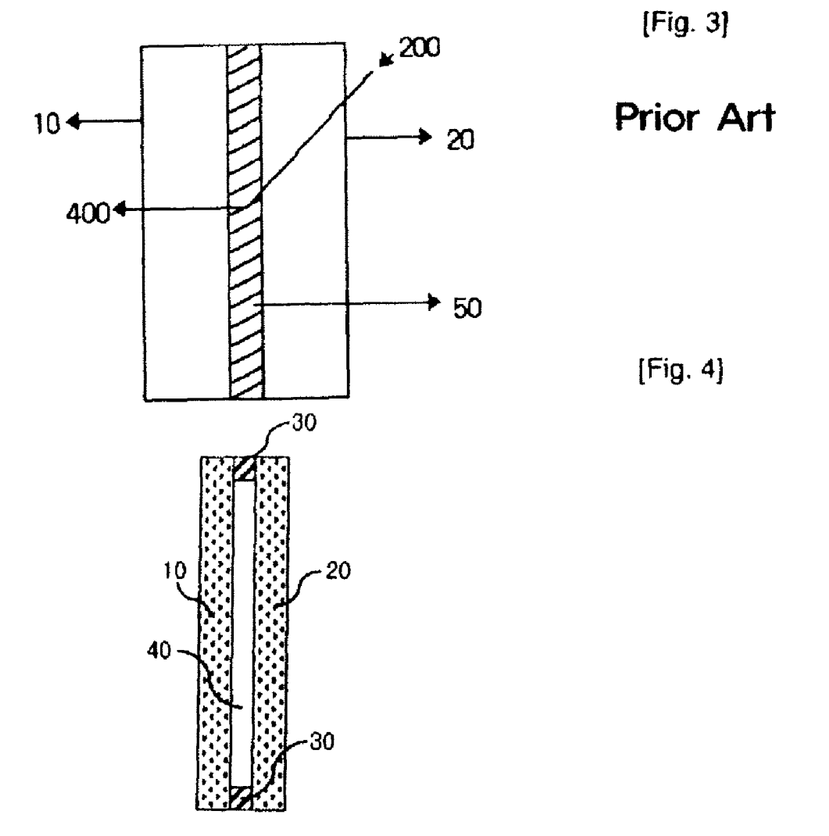
FIG. 3 is a sectional view of a prior holographic screen.
FIG. 4 is a sectional view of a rear-directional projection type laminated image panel in accordance with the present invention.

FIG. 3 is a sectional view of a prior holographic screen. Like shown in FIG. 3, the prior holographic screen is configured to view projective beams (400) in front direction by adding directional property to incident beams (200), which are projected at pre-determined angle in rear direction, to the front direction by cubic holograms (50). Such a holographic screen is composed of the cubic holograms (50) interposed between front elements (10) and rear elements (20). The cubic holograms (50) are made with a particular directional property by using short wavelength rays (ex, laser beams), after forming supplementary holograms on the surface of a transmissive material or forming layers with photopolymer or dichromate gelatin, and halogenated silver materials within the transmissive material. Representative examples of the above holographic screen are Holopro Screen of German Pronova corporation and Holo Screen of Japanese DNP corporation.

However, even though the prior holographic screen has a good point of realizing images without disturbing inside/outside visibility, it has a bad angular field on the aspect of characteristics of the cubic holograms (50) assigned with a regular directional property. Moreover, a fabrication method of the prior holographic screen is very complicated and difficult, causing a manufacturing cost of the screen to increase.

DISCLOSURE OF INVENTION

Technical Problem

It is therefore an object of the present invention to provide a laminated image panel and a fabrication method thereof for manufacturing the image panel in simple structure at a low manufacturing cost and with simple manufacturing equipment, as well as pursuing safety through a laminated glass scheme.

It is another object of the present invention to provide a laminated image panel and a fabrication method thereof which can implement various types of screens such as front-directional projection, rear-directional projection (including holographic), and bi-directional image panels by changing front elements and rear elements with only one kind of diffusing medium, as well as implement images with a wide angular field during image projection.

It is another object of the present invention to provide a diffusing medium for uniformly diffusing projected beams (projection images).

Technical Solution

To achieve the above object, the laminated image panel in accordance with the present invention is a laminated image panel for reflecting and/or transmitting projection images projected from an image optical engine, and for projecting the reflected and/or transmitted images on a screen, comprising: front elements; rear elements disposed in opposition to the front elements; sealants mutually sealing/bonding opposed rim parts of the front elements and the rear elements while separating the rim parts at certain intervals, and forming a predetermined cell consisting of the front elements, the rear elements, and the rim parts; and a diffusing medium for uniformly diffusing the projection images in transparent and/or semitransparent state by being injected into the cell. The diffusing medium makes a transparent solution by being dissolved in water, and consists of: based on overall weights, 0.5 to 35 weight % of a water-soluble polymeric material; based on overall weights, 31 to 98.5 weight % of a light curable hydrophilic monomer having hydrophilicity and a high dispersion in water; based on the overall weights of the light curable hydrophilic monomer, 0.1 to 5 weight % of a photoinitiator that induces a polymerization by interacting with the light curable hydrophilic monomer; and a polymeric material created by light-curing a composition which contains 0.5 to 35 weight % of a solvent based on overall weights.

Desirably, each sealant is composed of a separating material that separates the front elements from the rear elements at certain intervals, and an adhesive applied to upper and lower sides of the separating material. One of polyvinyl butyral, epoxy resin, acrylic resin, isobutylene, silicon, polysulfide, and a frit which is a low-temperature melt glass paste is selected as the adhesive. Also, one of polyvinyl butyral, epoxy resin, acrylic resin, isobutylene, silicon, polysulfide, and a frit which is a low-temperature melt glass paste can be selected as the sealant.

Meanwhile, one of a pure solvent, an organic solvent and a mixture of the pure and organic solvents is selected as the above solvent. The water-soluble polymeric material can be selected from at least one of poly N-isopropyl acrylamide, poly N-isopropyl acrylamide derivative, polymethyl vinyl ether and polymethyl vinyl ether derivative.

Also, the light curable hydrophilic monomer is selected from at least one of hydroxyethyl acrylate, hydroxyethyl methacrylate, hydroxypropyl acrylate, hydroxypropyl methacrylate, hydroxybutyl acrylate, hydroxybutyl methacrylate and dimethyl acrylamide. Likewise, the photoinitiator can be selected from at least one of benzophenone, ethyl4-(dimethylamino)benzoate, benzyl dimethylketal, 1-(4-(2-hydroxyethoxy)-phenyl)-2-hydroxy-2-methyl-1-propane-1-one, 2-hydroxy-2-methyl-1-phenyl-propane-1-one, trimethyl benzoyl diphenyl phosphine oxide and bisacrylphosphine oxide. Moreover, the composition can further mix a filling agent which can decrease a volume reduction during the polymerization. At this time, the filling agent consists of ultrafine particles of metal and/or metallic oxides containing gold, copper, alumina, iron oxide and silica, and is in concentration of 0.1 to 10 weight % based on the overall weights of the light curable hydrophilic monomer. And, a promoting agent for promoting an adhesive force between the front elements and the rear elements can be further mixed with the composition. The promoting agent includes one of 3-glycidoxypropyl dimethyl ethoxysilane, 3-glycidoxypropyl methyl diethoxysilane, 3 glycidoxypropyl trimethoxysilane, aminoethylaminopropyl trimethoxysilane, 3-metacryloxypropyl triketoxysilane, bis hydroxyethyl methacrylate phosphate and methoxypolyethylene glycol(meta)acrylate. Based on the overall weights of the light curable hydrophilic monomer, the promoting agent is in concentration of 0.1 to 25 weight %. Likewise, it is possible to further mix, with the composition, an antioxidant and/or a UV absorbent, which can reduce characteristic deterioration of the light curable hydrophilic monomer, as much as 0.01 to 5 weight % with regards to the diffusing medium. And, an organic solvent for preventing the diffusing medium from being frozen is further mixed, while the organic solvent is at least one of methanol, ethanol, propanol, isopropanol, butanol, 2-butanol, ethylene glycol, diethylene glycol and propylene glycol. Relating to water mixed within the composition, the organic solvent may be in 0.01 to 60 weight %.

Besides, the front elements and the rear elements are separated at 0.1 to 10 mm intervals. On an external surface of either the front elements or the rear elements, it is desirable to conduct functional surface treatments such as an anti-glare treatment for preventing glare caused by peripheral lighting or sunlight, an anti-reflection treatment for preventing a light reflection caused by sunlight or lighting, an anti-static treatment for removing static electricity, a prism treatment for improving brightness and a selective absorption treatment for selectively absorbing a particular wavelength. In the meantime, the laminated image panel can further comprise a total reflective layer having more than 80% reflectivity of visible rays and a protective layer that covers the total reflective layer on one side of the rear elements, or can further comprise a semireflective layer that reflects some of the incident visible rays while transmitting others of the rays and a protective layer that covers the semireflective layer on one side of the rear elements. On this occasion, the protective layer is formed in one of transparent film or coating film types.

Furthermore, to accomplish another object, a fabrication method of a laminated image panel in accordance with the present reflects and/or transmits projection images projected from an image optical engine and projects the reflected and/or transmitted images on a screen, comprising the steps of: a first step of forming a predetermined cell by bonding rim parts of front elements and rear elements with sealants, on a surface, if both elements are opposed to each other; a second step of generating a composition for a diffusing medium by mixing a water-soluble polymeric material that forms a transparent solution by being dissolved in water, a light curable hydrophilic monomer having hydrophilicity and a high dispersion in water, a photoinitiator that induces a polymerization by interacting with the light curable hydrophilic monomer and a solvent, in predetermined ratio; a third step of injecting the composition for the diffusing medium into the cell, and perfectly sealing the cell; and a fourth step of exposing the cell to at least one selected from UV rays, electron beams, and visible rays, for a predetermined time; and wherein the first step and the second step can be carried out in any order.

In addition, to attain another object, a diffusing medium in accordance with the present invention is a diffusing medium that uniformly diffuses projection images in transparent and/or semitransparent state, and is created through a light-curing process by irradiating beams including UV rays, electron beams, and visible rays on a pre-determined composition for a predetermined time. The composition consists of: at least one water-soluble polymeric material selected from 0.5 to 35 weight % poly N-isopropyl acrylamide based on overall weights of the composition, poly N-isopropyl acrylamide derivative, polymethyl vinyl ether and polymethyl vinyl ether derivative; at least one light curable hydrophilic monomer selected from 31 to 98 weight % of hydroxyethyl acrylate based on the overall weights of the composition, hydroxyethyl methacrylate, hydroxypropyl acrylate, hydroxypropyl methacrylate, hydroxybutyl acrylate, hydroxybutyl methacrylate and dimethylacryl amide; 0.5 to 35 weight % of a solvent based on the overall weights of the composition; and at least one photoinitiator selected from 0.1 to 5 weight % of benzophenone based on the overall weights of the light curable hydrophilic monomer, ethyl4(dimethylamino)benzoate, benzyldimethylketal, 1-(4-(2-hydroxyethoxy)-phenyl)-2-hydroxy-2-methyl-1-propane-1-one, 2-hydroxy-2-methyl-1-phenyl-propane-1-one, trimethyl benzoyl diphenyl phosphine oxide and bisacrylphosphine oxide; and wherein the photoinitiator induces a polymerization by interacting with the light curable hydrophilic monomer when a beam is irradiated.

BRIEF DESCRIPTION OF THE DRAWINGS

The disclosed inventions will be described with reference to the accompanying drawings, which show important sample embodiments of the invention and which are incorporated in the specification hereof by reference, wherein.

BEST MODE FOR CARRYING OUT THE INVENTION

The present invention now will be described more fully hereinafter with reference to the accompanying drawings, in which typical embodiments of the invention are shown.

FIG. 4 is a sectional view of a rear-directional projection type laminated image panel of one embodiment in accordance with the present invention. Like shown in FIG. 4, the rear-directional projection type laminated image panel in accordance with the present invention comprises front elements (10), rear elements (20), a transmissive diffusing medium (40) injected between the elements (10, 20), and sealants (30) for sealing the transmissive diffusing medium (40). At this point, the sealants (30) maintain intervals between the front elements and the rear elements, and at the same time seal the diffusing medium (40). The transmissive diffusing medium (40) is surrounded by one pair of materials consisting of the front elements (10) and the rear elements (20), and more specifically, the transmissive diffusing medium is filled within a cell formed by the one pair of the materials and the sealants, and is sealed. In this case, at least one part of the front elements (10) and the rear elements (20) is transparent to see the inside from the outside. There are no special restrictions on intervals between the one pair of the materials filled with the transmissive diffusing medium (40), but it is more convenient and better for diffusing characteristics, to form the intervals in 0.1 to 10 mm, desirably, 0.1 to 3 mm.

The front elements (10) and the rear elements (20) in accordance with the present invention may be configured with glass, plastic, ceramic and metal. In case of the glass, it is available to use various types of glasses such as general transparent glass, semitransparent glass, etching glass, coloring glass, tempered glass, bonded glass, wired glass, heat absorbing glass, reflective glass, UV absorbing glass, metal coating glass or mirror glass. Also, when the plastic is used for the elements, it is possible to use any kind of general PET film, heat shielding film, UV blocking film, metal coated film, Saran film made by Dow Product or special film like Aclar film made by Allied Product, as well as a transparent or semitransparent acryl resin plate and a poly-carbonate resin plate. At least one-sided material of the one pair of the materials containing the front elements (10) and the rear elements (20) can be formed in multilayer type having more than one fold. That is, it is possible to overlap various thin layers for the material.

Functional surface treatments can be added to an external surface of a material that constitutes the cell of the laminated image panel. The functional surface treatments are divided into an anti-glare treatment for preventing glare caused by peripheral lighting or sunlight, an anti-reflection treatment for preventing a light reflection caused by lighting or sunlight, an anti-static treatment for removing static electricity, a prism treatment for improving brightness and a selective absorption treatment for selectively absorbing a particular wavelength. Moreover, a method of coating a functional material on the external side of the material or a method of attaching functional films with an adhesive can be used as a surface treatment method.

The sealants (30) in accordance with the present invention maintain the intervals between the materials consisting of the front elements (10) and the rear elements (20), and block the transmissive diffusing medium (40) from external environments. For the sealants (30), double-sided tapes in certain thickness are used, or polyvinyl butyral, epoxy resin, acrylic resin, isobutylene, silicon or polysulfide used during fabrication of general multiple-layered glasses or bonded glasses can be applied. Or, it is available to use a frit, which is a low-temperature melt glass paste. There are different kinds of the sealants, in terms of moisture-cure, thermosetting, and light curable properties, and the sealants are selectively used according to a required fabrication process of the laminated image panel in accordance with the present invention. On the other hand, the sealants (30) in accordance with the present invention may comprise separating materials that separate the front elements (10) from the rear elements (20) at certain intervals, and adhesives applied to upper/lower sides of the separating materials. At this moment, it is needless to say that one of polyvinyl butyral, epoxy resin, acrylic resin, isobutylene, silicon, polysulfide, and a frit which is a low-temperature melt glass paste, can be used as the adhesive.

The transparent or semitransparent diffusing medium (40) in accordance with the present invention is a medium obtained by light-curing a composition that contains at least one selected water-soluble polymeric material, at least one selected light curable hydrophilic monomer, a solvent and a photoinitiator. This medium can realize projection images by uniformly diffusing the images even in transparent or semitransparent state.

The solvent used in the diffusing medium (40) is selected from a purified water, an organic solvent or a mixture thereof. The solvent is in 0.5 to 35 weight % for overall weights of the diffusing medium, and desirably, in 1 to 33 weight %. If less than 0.5 weight % of a solvent or more than 35 weight % of a solvent is used, the diffusing medium may be deficient in diffusing characteristics.

Furthermore, the water-soluble polymeric material used for the diffusing medium (40) should be a transparent solution by being dissolved in water. For instance, poly N-isopropyl acrylamide and a derivative thereof, and polymethyl vinyl ether and a derivative thereof may be used as the water-soluble polymeric material. Based on overall weights of the diffusing medium, the water-soluble polymeric material is in 0.5 to 35 weight %, and desirably, in 1 to 33 weight %. If less than 0.5 weight % of a water-soluble polymeric material or more than 35 weight % of a water-soluble polymeric material is used, the diffusing medium may be deficient in diffusing characteristics.

The light curable hydrophilic monomer used for the diffusing medium (40) should be maintained in transparent state, by being easily dispersed in water without influencing a transparent aqueous solution of the water-soluble polymeric material. Thus, it is desirable for the monomer to have hydrophilicity and a high dispersion in water. A multifunctional monomer tends to affect an adhesive force between the front elements (10) and the rear elements (20) of the laminated transmissive panel. In case the multifunctional monomer is used, the monomer cross-links while being polymerized by an initiator, resulting in an increase of a volume reduction ratio, in which the monomer more decreases in volume than an original mixed composition. Therefore, a shrinkage stress is produced from a large shrinkage caused by a cross-linking of the diffusing medium (40) within the cell consisting of the front/rear elements (10,20) and the sealants (30). Accordingly, an exfoliation that the diffusing medium (40) is separated from the front/rear elements (10,20) may occur, and this deteriorates a quality of the laminated image panel.

As for light curable hydrophilic monomers, they tend to disperse in water, and it is possible to use selected hydrophilic monomers where the polymerization is progressed by an initiator. For example, hydroxyalkyl ester of an unsaturated carboxylic acid, that is, hydroxyethyl acrylate, hydroxyethyl methacrylate, hydroxypropyl acrylate, hydroxypropyl methacrylate, hydroxybutyl acrylate, hydroxybutyl methacrylate and dimethyl acrylamide may be used. And, it is needless to say that the light curable hydrophilic monomer can be made with more than one of the above materials. The light curable hydrophilic monomer is in 31 to 98.5 weight % based on the overall weights of the diffusing medium, and desirably, in 33 to 97.5 weight %. If less than 31 weight % or more than 98.5 weight % is used, diffusing characteristics of the diffusing medium may deteriorate.

With regards to the photoinitiator used for the diffusing medium (40), it is available to use any kind of photoinitiator which can induce a polymerization by interacting with the light curable hydrophilic monomer. For instance, there exist photoinitiators such as benzophenone, ethyl4-(dimethylamino)benzoate, benzyl dimethyl ketal, 1-(4-(2-hydroxyethoxy)-phenyl)-2-hydroxy-2-methyl-1-propane-1-one, 2-hydroxy-2-methyl-1-phenyl-propane-1-one, 2,4,6-trimethyl benzoyl diphenyl phosphine oxide, and bisacrylphosphine oxide. Among the above photoinitiators, it is possible to selectively use more than one kind of the photoinitiators. The photoinitiator can be generally in concentration of roughly 0.1 to 5 weight % with regards to each monomer which can be polymerized, and desirably, in 0.2 to 4 weight %.

If the polymerization is executed by irradiating UV rays, visible rays or electron beams after uniformly mixing at least more than one water-soluble polymeric material, a solvent, at least more than one light curable hydrophilic monomer, and a photoinitiator, within the suggested ratio, a polymeric material that disperses transmitted beams while maintaining a transparent or semitransparent state at room temperature, that is, the transmissive diffusing medium (40) is made.

Meanwhile, the diffusing medium (40) in accordance with the present invention can further comprise a filling agent that can decrease a volume reduction during the polymerization. As ultrafine particles, that is, nanometer particles for the filling agent, it is available to use any kind of metals or metal oxides which can pass through visible rays. For example, it is possible to selectively use the ultrafine particles like gold, copper, alumina, iron oxide and silica for the filling agent. Desirably, the above ultrafine particles should be in sol type to be dispersed in a solvent. And, it is desirable for the filling agent in accordance with the present invention to be in concentration of 0.1 to 10 weight % based on overall weights of the monomer.

At the same time, the diffusing medium (40) can further comprise a promoting agent that promotes an adhesive force of a material. For instance, as the promoting agent, it is possible to use 3-glycidoxypropyl dimethyl ethoxysilane, 3-glycidoxypropyl methyl diethoxysilane, 3-glycidoxypropyl trimethoxysilane, aminoethylaminopropyl trimethoxysilane, 3-methacryloxypropyl trimethoxysilane, bis hydroxyethyl methacrylate phosphate, and methoxypolyethylene glycol(meta)acrylate. In case the front elements (10) and the rear elements (20) are used as metals or glasses, it is shown that the promoting agent promotes an adhesive force by an interaction between a material and functional groups such as phosphate, methoxy, ethoxy, and glydoxy. The promoting agent in accordance with the present invention is desirably in 0.1 to 25 weight % based on the overall weights of the monomer. If less than 0.1 weight % of the promoting agent is used, it cannot largely influence on an improvement of the adhesive force, and in case of more than 25 weight %, it affects a thermal polymer and a monomer, having an effect on dispersing characteristics.

Various additives can be added to the diffusing medium (40) in accordance with the present invention. For instance, coloring matters like paints or dyes, which can be uniformly dispersed in water or in a monomer, may be added to display coloring effects on a laminated projection type screen or to improve contrast by absorbing external beams. Also, an antioxidant and/or a UV absorbent can be added to reduce characteristic deterioration of the monomer. In this case, the above additives should be dispersed in water or in the monomer, and it is desirable to add the additives in a ratio of 0.01 to 5 weight % for the diffusing medium (40).

If water is contained as a solvent of the diffusing medium (40), an organic solvent may be added to solve a problem of being frozen at sub-zero temperature. For the organic solvent, at least one alcohol selected from a group consisting of methanol, ethanol, propanol, isopropanol, butanol, 2-butanol, ethylene glycol, diethylene glycol, and propylene glycol can be used as an alcoholic water of the diffusing medium in accordance with the present invention. Such an organic material can improve dispersion and stability of some diffusing media as well as prevent freezing. The addition amount of the organic solvent varies from on which function is focused more, for instance, whether a freezing prevention function or a dispersion improving function is concentrated, or differs from concentration and mutual affinity of the diffusing medium. However, the addition amount should reach a ratio of 0.01 to 60 weight % based on the quantity of water used within the diffusing medium (40), and desirably, 1 to 10 weight %.

Now, a fabrication process of the laminated image panel illustrated in FIG. 4 will be described below. First, a cell is formed by sealants (30) and one pair of materials consisting of front elements (10) and rear elements (20). Next, a composition for a transmissive diffusing medium is injected into an empty space of the formed cell, and then the panel is sealed.

If the sealed panel is exposed to UV rays, electron beams or visible rays for a certain time, the composition for the transmissive diffusing medium disposed within the cell induces a polymerization. The polymerized panel is used as a laminated image panel which realizes images at room temperature. In case the images are irradiated by using a projector on the panel fabricated through the above process, holographic effects may be presented if a transparent diffusing medium and a transparent material are used, while rear projection-type clear projection images are obtained if a semitransparent diffusing medium and a semitransparent material are used.

Figure 5:
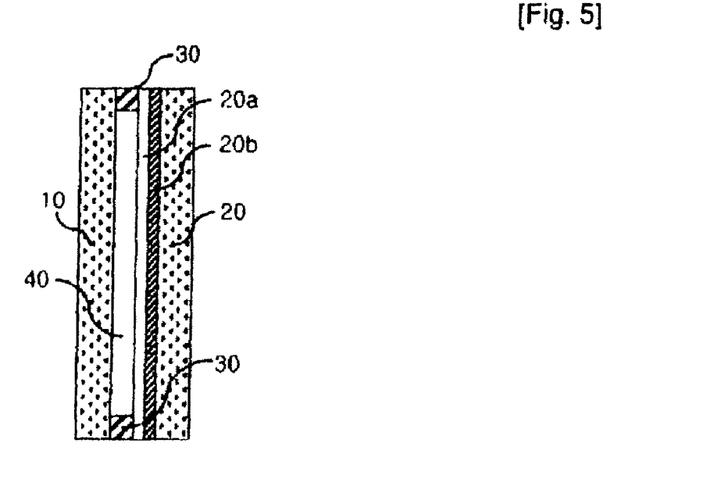
FIG. 5 is a sectional view of a front-directional projection type laminated image panel in accordance with the present invention.
Figure 6:
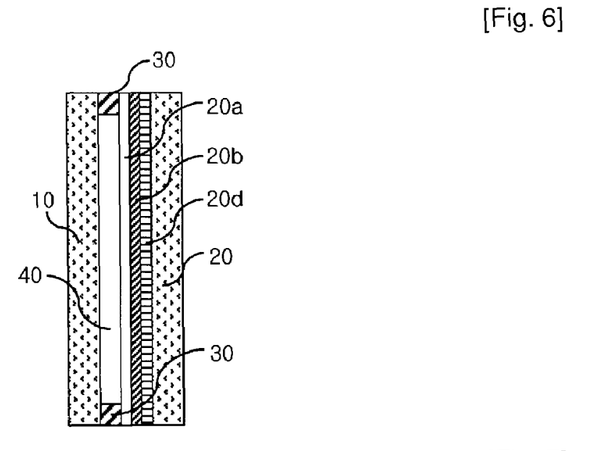
FIG. 6 is a sectional view of another embodiment of the front-directional projection type laminated image panel in accordance with the present invention.
Figure 7:
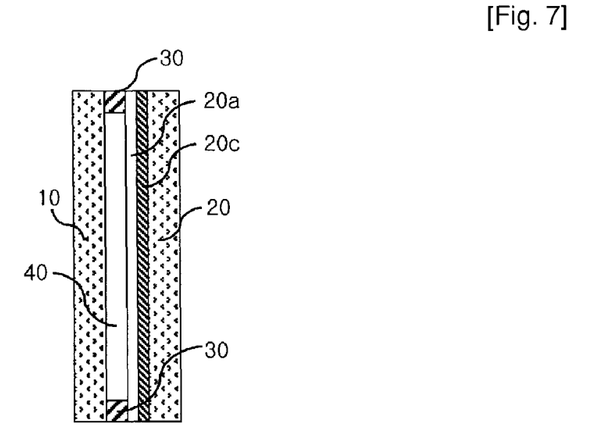
FIG. 7 is a sectional view of a two-way laminated image panel in accordance with the present invention.

By adding special processes based on the fundamental manufacturing processes mentioned above, various embodiments of panels can be fabricated like shown in FIGS. 5, 6, and 7. FIG. 5 is a sectional view of a front-directional projection type laminated image panel of one embodiment in accordance with the present invention, FIG. 6 is a sectional view of another embodiment of a front-directional projection type laminated image panel in accordance with the present invention, and FIG. 7 is a sectional view of a two-way laminated image panel in accordance with the present invention.

The front-directional projection type laminated image panel of the one embodiment illustrated in FIG. 5 further comprises a total reflective layer (20b) that reflects most of visible rays (roughly, more than 80% of reflectivity of the visible rays), and a protective layer (20a) that protects the total reflective layer (20b), on one side of rear elements (20).

*The front-directional projection type laminated image panel of another embodiment illustrated in FIG. 6 comprises a total reflective layer (20b) that reflects most of visible rays by using an adhesive layer (20d) on an inner surface of rear elements (20), and has a protective layer (20a) that protects the total reflective layer (20b) in transparent film type.

The two-way laminated image panel illustrated in FIG. 7 comprises a semireflective layer (20c) on an inner side of rear elements (20). On one side of materials used as the rear elements (20), the semireflective layer (20c) that reflects some of incident visible rays while transmitting others of the visible rays, and a protective layer (20a) that protects the semireflective layer (20c), are disposed. In case of the two-way laminated image panel of FIG. 7, if images are projected with a projector in front direction, the user can view the images in both front and rear directions.

Hereinafter, the embodiments for manufacturing the front-directional projection type laminated image panel, the rear-directional projection type laminated image panel, and the two-way laminated image panel in accordance with the present invention will be suggested as follows.

Embodiment 1

Rear-Directional Projection Type Laminated Image Panel

A composition is prepared, through a uniform mixing and dispersing process of 188.9 grams of polymethyl vinyl ether as a water soluble polymeric material, 555.8 grams of hydroxyethyl acrylate as a light curable hydrophilic monomer, 24 grams of trimethyl benzoyl diphenyl phosphine oxide as a photoinitiator, and 211.1 grams of purified water. Next, a cell is formed by sealing edges of a glass plate, with the use of 2 sheets of transparent glasses (88.6% transmissivity of visible rays) which are in 4 mm thickness at 30 cm², as a combination of spacer and sealing material which is in 1.6 mm thickness. The prepared composition is injected into the cell, and an injection port is sealed with silicon. Then, the sealed cell is exposed to a 200 W UV lamp for about 50 minutes, thereby manufacturing the laminated image panel.

The laminated image panel manufactured like above could show holographic effects as if images floated in the air while the images were presented on a front side of the transparent panel, when a beam projector was illuminated in rear direction at room temperature (approx. 24° C.). Furthermore, the panel has shown a 180 degrees angular field.

Embodiment 2

Two-Way Laminated Image Panel

As a combination of spacer and sealing material which is in 1.6 mm thickness, 1 sheet of transparent glass (88.6% transmissivity of visible rays) which is in 4 mm thickness at 30 cm² and 1 sheet of reflective glass (41% transmissivity of visible rays, 15% reflectivity) which is in 6 mm thickness at 30 cm² are used to form a cell by sealing edges of a glass plate. After injecting the same composition as the embodiment 1 is injected into an inner space of the cell, an injection port is sealed with silicon. The sealed cell is exposed to a 200 W UV lamp for about 50 minutes, thereby manufacturing the two-way laminated image panel.

The above two-way laminated image panel could present images on both front and rear sides of the panel, when a beam projector was illuminated in rear direction at room temperature (approx. 24° C.).

Embodiment 3

Front-Directional Projection Type Laminated Image Panel

As a combination of spacer and sealing material which is in 1.6 mm thickness, 1 sheet of transparent glass (88.6% transmissivity of visible rays) which is in 4 mm thickness at 30 cm² and 1 sheet of mirror glass (94% reflectivity of visible rays) which is in 5 mm thickness at 30 cm² are used to form a cell by sealing edges of the glass plate. After injecting the composition of the embodiment 1 into an inner space of the cell, an injection port is sealed with silicon. The sealed cell is exposed to a 200 W UV fluorescent lamp for about 50 minutes, thereby manufacturing the front-directional projection type laminated image panel.

The front-directional projection type laminated image panel manufactured like above could show images on a front side of the panel, when a beam projector was illuminated in front direction at room temperature (approx. 24° C.).

Meanwhile, once the fundamental structure suggested in FIGS. 4, 5, 6, and 7 is slightly transformed for applications, it is possible to easily apply the transformed structure to laminated image panels having various different schemes.

Figure 8:
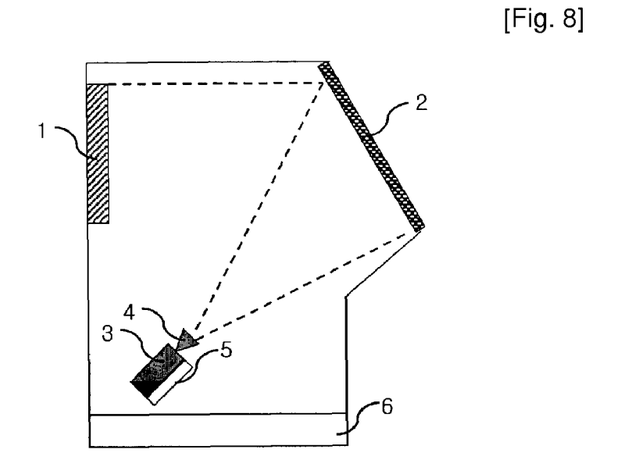
FIG. 8 is a format diagram of a projection TV assembly applied with the rear-directional projection type laminated image panel in accordance with the present invention.
Figure 9:
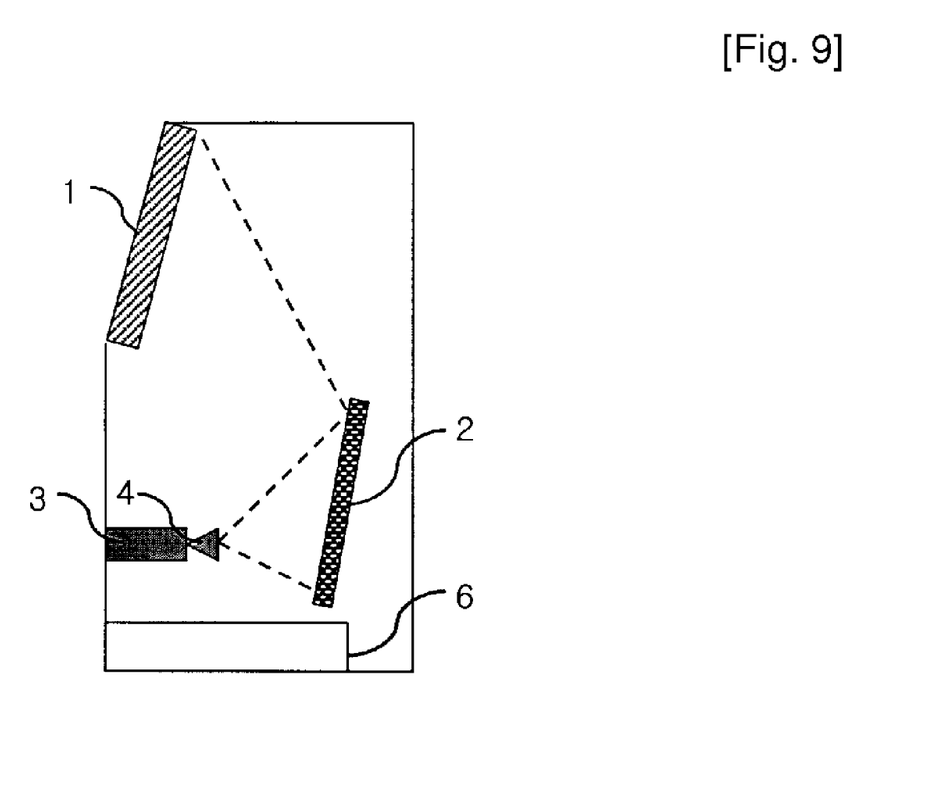
FIG. 9 is a format diagram of a projection monitor assembly applied with the rear-directional projection type laminated image panel in accordance with the present invention.

FIG. 8 and FIG. 9 illustrate examples of an image projection system applied with a laminated image panel in accordance with the present invention, and particularly, show embodiments of applying a rear-directional projection type laminated image panel as a screen for a projection TV and a projection monitor. FIG. 8 is a format diagram of a projection TV assembly applied with the rear-directional projection type laminated image panel, while FIG. 9 is a format diagram of a projection monitor assembly applied with the rear-directional projection type laminated image panel. In reference to FIG. 8 and FIG. 9, an image projection process of the projection TV and the projection monitor applied with the rear-directional projection type laminated image panel will be described below.

For an electric image signal transmitted from a circuit board (6), an image optical engine (3) composed of a CRT, an LCD or a DMD (Digital Micro Mirror Device) chip realizes images. The images outputted from the image optical engine (3) are projected on a reflective mirror (2) through a lens unit (4). The images reflected by the reflective mirror (2) are irradiated on a rear side of a laminated image panel (1). Since the laminated image panel is the rear-directional projection type laminated image panel, the projected images can be shown on a front side by passing through the laminated image panel (1). At this time, if a fresnel lens sheet is selectively added to a rear side of the laminated image panel (1), more uniform images can be projected at overall areas of the image panel. On the other hand, because the image optical engine (3) emits a lot of heat, a cooling means (5) for cooling the emitted heat may be additionally comprised.

INDUSTRIAL APPLICABILITY

Like mentioned so far, a laminated image panel and a fabrication method thereof in accordance with the present invention can realize various types of screens such as front-directional projection type, rear-directional projection type, and two-way laminated image panels. Besides, it is possible to implement a simple structure, thereby reducing a manufacturing cost.

That is, the laminated image panel and the fabrication method thereof in accordance with the present invention have the following benefits:

First, it is available to easily manufacture the present invention through a simple manufacturing process at a low manufacturing cost;

Second, safety can be acquired through a laminated glass scheme;

Third, various types of screens can be implemented, including front-directional projection type, rear-directional projection type (including holographic), and two-way laminated image panels, with only one kind of diffusing medium by changing front elements and rear elements;

Fourth, images with a wide angular field can be obtained during image projection; and Finally, it can be widely applied for various purposes such as glass doors, office partitions, shop windows, etc., as well as projection-type image screens.

In the drawings and specification, there have been disclosed typical preferred embodiments of the invention and, although specific terms are employed, they are used in a generic and descriptive sense only and not for purposes of limitations, the scope of the invention being set forth in the following claims.

The invention claimed is:

1. A laminated image panel for realizing projection images by reflecting transmitting, and diffusing the images projected from an image optical engine, comprising:
   front elements; rear elements disposed in opposition to the front elements;
   sealants mutually sealing/bonding opposed mm parts of the front elements and the rear elements while separating the rim parts at certain intervals, and forming a predetermined cell surrounded by the front elements, the rear elements, and the rim parts; and
   a diffusing medium for uniformly diffusing the projection images in transparent and/or semitransparent state by being injected into the cell; and wherein the diffusing medium is made of the polymeric material obtained by a light curing composition, and the light curing composition comprises:
   0.5% to 35% of a water soluble polymeric material, based on overall weight of the light curing composition and said material being dissolved in water and turning the light curing composition into a transparent solution;
   31% to 98.5% of a light curable hydrophilic monomer, based on overall weights of the light curing composition and said monomer having hydrophilic property and a high dispersion in water;
   0.1% to 5% of a photoinitiator, based on the overall weight of the light curable hydrophilic monomer and said initiator inducing a polymerization by interacting with the light curable hydrophilic monomer; and
   0.5% to 35% of a solvent, based on overall weight of the light curing composition.

2. The laminated image panel of claim 1 wherein the solvent is at least one solvent selected from purified water, an organic solvent, and a mixture of the purified water and the organic solvent.

3. The laminated image panel of claim 1, wherein the water soluble polymeric material is at least one material selected from poly N-isopropyl acryl amide, poly N-isopropyl acrylamide derivative, polymethyl vinyl ether and polymethyl vinyl ether derivative.

4. The laminated image panel of claim 1, wherein the light curable hydrophilic monomer is at least one et monomer selected from hydroxy ethyl acrylate, hydroxyethyl methacrylate, hydroxypropyl acrylate, hydroxypropyl methacrylate, hydroxybutyl acrylate, hydroxybutyl methacrylate and dimethyl acrylamide.

5. The laminated image panel of claim 1, wherein the sealants are composed of separating materials that separate the front elements from the rear elements at certain intervals, and adhesives applied to upper and lower sides of the separating materials, then each adhesive is at least one selected from polyvinyl butyral, epoxy resin, acrylic resin, isobutylene, silicon, polysulfide, and frit which is a low-temperature melt glass paste.

6. The laminated image panel of claim 1, wherein each sealant is at least one selected from polyvinyl butyral, epoxy resin, acrylic, resin, isobutylene, silicon, polysulfide, and frit which is a low-temperature melt glass paste.

7. The laminated image panel of claim 1, wherein the composition further comprises a filling agent which can decrease a volume reduction during, the polymerization, and the filling agent consists of ultrafine particles of metal and/or metallic oxides containing gold, copper, alumina, iron oxide and silica, and is in the ratio of 0.1% to 10% by weight based on the overall weights of the light curable hydrophilic monomer.

8. The laminated image panel of claim 1, wherein a promoting agent for promoting an adhesive force between the front elements and the rear elements can be further mixed with the composition, and the promoting agent is at least one selected from 3-glycidoxypropyl dimethyl ethoxysilane, 3-glycidoxypropyl methyl diethoxysilane, 3 glycidoxypropyl trimethoxysilane, aminoethylaminopropyl trimethoxysilane, 3-metacryloxypropyl triketoxysilane, bishydroxyethyl methacrylate phosphate and methoxypolyethylene glycol(meta) acrylate, and is in the ratio of 0.1% to 25% by weight based on the overall weights of the light curable hydrophilic monomer.

9. The laminated image panel of claim 1, wherein the composition is further mixed with an antioxidant and/or a UV absorbent, which can reduce characteristic deterioration of the light curable hydrophilic monomer, as much as 0.01% to 5% by weight with regards to the overall weights of the composition.

10. The laminated image panel of claim 1, wherein the composition is further mixed with an organic solvent that prevents the diffusing medium from being frozen, and the organic solvent is at least one selected from methanol, ethanol, propanol, isopropanol, butanol, 2-butanol, ethylene glycol, diethylene glycol and propylene glycol, then relating to the solvent mixed within the composition, the organic solvent may be in 0.01% to 60% by weight based on overall weights of mixture of water and organic solvent.

11. The laminated image panel of claim 1, wherein intervals between the front elements and the rear elements are 0.1 mm to 10 mm.

12. The laminated image panel of claim 1, wherein at least one functional surface treatment is applied on an external surface of either the front elements or the rear elements, and the functional surface treatment includes at least one of an anti-glare treatment for preventing glare caused by peripheral lighting or sunlight, an anti-reflection treatment for preventing a light reflection caused by sunlight or lighting, an anti-static treatment for removing static electricity, a prism treatment for improving brightness and a selective absorption treatment for selectively absorbing a particular wavelength.

13. The laminated image panel of claim 1, wherein a total reflective layer having more than 80% reflectivity of visible rays and a protective layer that covers the total reflective layer are further comprised on one side of the rear elements.

14. The laminated image panel of claim 1, wherein a semireflective layer that reflects some of incident visible rays while transmitting others of the rays and a protective layer that covers the semireflective layer are further comprised on one side of the second materials.

15. The laminated image panel of claim 13 or 14, wherein the protective layer is selected from either a transparent film type or a coating film type.

16. An image projection system, comprising: the laminated image panel of claim 1.

17. A method for manufacturing a laminated image panel that displays images projected from an image optical engine, on a screen by reflecting, transmitting and diffusing the images, comprising the steps of:
 a first step of forming a predetermined cell by bonding front elements, rear elements disposed in Opposition to the front elements, and opposed rim parts of the front elements and the rear elements with sealants;
 a second step of generating a composition, the composition comprising:
  0.5% to 35% of a water soluble polymeric material, based on overall weight of the composition and said material being dissolved in water and turning the composition into a transparent solution:
  31% to 98.5% of a light curable hydrophilic monomer, based on overall weights of the composition and said monomer having hydrophilic property and a high dispersion in water;
  0.1% to 5% of a photo initiator, based on the overall weight of the light curable hydrophilic monomer and said initiator inducing a polymerization by interacting with the light curable hydrophilic monomer; and
  0.5% to 35% of a solvent, based on overall weight of the composition;
 a third step of injecting, the composition into the predetermined cell, and perfectly sealing the predetermined cell; and
 a fourth step of exposing at least one beam selected from UV rays, electron beams, and visible rays, to the composition; and wherein the first step and the second step can be carried out in any order.

18. A diffusing medium for uniformly diffusing projected beams in transparent or semitransparent state, the diffusing medium is obtained by light curing one of UV rays, electron beams, and visible rays after irradiating the selected one on a predetermined composition, and the composition comprises:
 0.5% to 35% of a water-soluble polymeric material, based on overall weight of the composition and said material being dissolved in water and turning the composition into a transparent solution;
 31% to 98.5% of a light curable hydrophilic monomer, based on overall weight of the composition and said monomer having hydrophilic property and a high dispersion in water;
 0.1% to 5% of a photo initiator, based on the overall weight of the light curable hydrophilic monomer and said intiator inducing a polymerization by interacting with the light curable hydrophilic monomer; and
 0.5% to 35% of a solvent, based on overall weight of the composition.

* * * * *